United States Patent [19]

Nakamura et al.

[11] 4,427,784

[45] Jan. 24, 1984

[54] FLUOPHOSPHATE OPTICAL GLASS

[75] Inventors: Hiroshi Nakamura, Yokohama; Takeo Icwimura, Tokyo, both of Japan

[73] Assignee: Nippon Kogaku K.K., Tokyo, Japan

[21] Appl. No.: 280,468

[22] Filed: Jul. 6, 1981

Related U.S. Application Data

[63] Continuation of Ser. No. 136,774, Apr. 3, 1980, abandoned.

[30] Foreign Application Priority Data

Apr. 24, 1979 [JP] Japan .................................. 54-50401

[51] Int. Cl.³ .......................... C03C 3/16; C03C 3/18
[52] U.S. Cl. ........................................ 501/44; 501/73; 501/902; 501/903
[58] Field of Search ................... 501/44, 73, 902, 903

[56] References Cited

U.S. PATENT DOCUMENTS

| 2,901,362 | 8/1959 | Pincus | 501/44 |
| 4,120,814 | 10/1978 | Izumitani et al. | 501/44 |
| 4,142,986 | 3/1979 | Rapp | 501/44 |
| 4,213,788 | 7/1980 | Kamiyama et al. | 501/48 |
| 4,225,459 | 9/1980 | Faulstich et al. | 501/44 |
| 4,358,543 | 11/1982 | Nozawa | 501/73 |
| 4,363,879 | 12/1982 | Broemer et al. | 501/44 |

FOREIGN PATENT DOCUMENTS

| 1496656 | 11/1971 | Fed. Rep. of Germany | 501/44 |
| 2717916 | 10/1978 | Fed. Rep. of Germany | 501/44 |

OTHER PUBLICATIONS

Laser Program Annual Report-1975-Lawrence Livermore Laboratory-U of Calif-pub. Mar. 1976, pp. 197-202.

*Primary Examiner*—Helen M. McCarthy
*Attorney, Agent, or Firm*—Fitzpatrick, Cella, Harper & Scinto

[57] ABSTRACT

This specification discloses fluophosphate optical glass of low dispersion containing no beryllium and arsenic and having an optical constant $nd = 1.43-1.48$ and $\nu d = 85-97$ and which can be produced stably and easily.

2 Claims, No Drawings

FLUOPHOSPHATE OPTICAL GLASS

This is a continuation of application Ser. No. 136,774, filed on Apr. 3, 1980 now abandoned.

BACKGROUND OF THE INVENTION

1. Field of the Invention

This invention relates to the composition of fluophosphate optical glass in which dispersion is particularly small, and the optical constant thereof is such that the refractive index nd=1.43–1.48 and the Abbe number $\nu d=85-97$.

2. Description of the Prior Art

It is well known that the use of low dispersion glass in an optical system provides a small chromatic aberration which leads to obtainment of images of good quality. Particularly, fluophosphate optical glass exhibits relatively great abnormal partial dispersion and enables good correction of secondary spectrum and therefore, the effect thereof is further enhanced. As a glass containing a high amount of fluorine, there is known the so-called fluoride glass having beryllium fluoride $BeF_2$ as the glass former. The optical constant thereof is such that nd=1.33–1.42 and $\nu d=90-105$. However, beryllium has a strong toxicity and therefore, fluophosphate glass containing no beryllium and having phosphate added thereto as the glass former and having improved stability for devitrification is known. For example, in the $P-Al-R^{II}-F-O$ system ($R^{II}$ is an alkaline earth metal) as disclosed in Japanese Patent Publication No. 7430/1957, a glass composition of optical constant nd=1.45–1.55 and $\nu d=80-90$ is known, but the Abbe number thereof could not equal that of fluoride glass having beryllium fluoride as the glass former. To overcome this demerit, materials having small contents of phosphor P and oxygen O and having great quantities of calcium compound and alkaline metal compound introduced thereinto have been reported. For example, Japanese Laid-open Patent Application No. 132014/1978 discloses a glass consisting of $P_2O_5+As_2O_3$ 6–12, $R^I_2O$ ($R^I$ is an alkaline metal) 3–15, CaO 22–26, $Al_2O_3$ 18–21, $SrO+BaO$ 5–11 and $F_2-O$ 27–30 (all being in percent by weight) and having an optical constant nd=1.40–1.44 and $\nu d=86-94$. However, this glass has strongly toxic arsenic introduced thereinto as required and moreover, has a great deal of alkaline metal compound and therefore, the viscosity of its molten glass liquid has become very low and it has been very difficult to mold it during the cast.

SUMMARY OF THE INVENTION

It is the object of the present invention to overcome the above-noted disadvantages of the fluophosphate glass according to the prior art and to provide fluophosphate optical glass of low dispersion containing no beryllium and arsenic and having an optical constant nd=1.43–1.48 and $\nu d=85-97$ and which can be produced stably and easily.

The fluophosphate optical glass according to the present invention essentially consists of $P-Al-R^{II}-Si-F-O$ ($R^{II}$ is an alkaline earth metal) and is characterized in that silicon Si as a requisite component has been newly introduced into the known fluophosphate glass.

DESCRIPTION OF THE PREFERRED EMBODIMENTS

In the $P-Al-R^{II}-Si-F-O$ system on which the present invention is based, it has been found that a glass having a greater Abbe number ($\nu d=85-97$) than Japanese Patent Publication No. 7430/1957 can be obtained by decreasing the contents of phosphor P and oxygen O and selecting the contents of alkaline earth metal $R^{II}$ in a specific range. Further, by introducing silicon Si as a requisite component, the viscosity of the molten glass liquid is remarkably enhanced and accordingly, it has become possible to make the molding of glass during the cast very easy as compared with the glass of Japanese Laid-open Patent Application No. 132014/1978. Moreover, it has become clear that in a specific range of Si contents, a remarkable devitrification suppressing effect can be obtained by the introduction thereof.

The composition range of the fluophosphate optical glass according to the present invention will be shown below in mol percent by fluoride expression.

| | |
|---|---|
| $PF_5$ | 5–21 |
| $AlF_3$ | 17–40 |
| $CaF_2$ | 13–40 |
| $SrF_2$ | 0–23 |
| $BaF_2$ | 0–25 |
| $SrF_2 + BaF_2$ | 8–33 |
| $SiF_4$ | 0.05–5 |
| $R^IF$ | 0–14 |
| ($R^IF$ is a combination of one or two or more of LiF, NaF or KF.) | |
| $MgF_2$ | 0–22 |
| $ZnF_2$ | 0–7 |
| $YF_3$ | 0–7 |
| $LaF_3$ | 0–7 |

Of these, the ratio $F^-/O^{2-}$ of fluorine ion number to oxygen ion number in the glass is 2.6–15.

The range of the contents of each component has been determined by the following reason. Fluoride glass containing no beryllium would not be vitrified unless subjected to extreme quenching and thus, it is not suited for industrialization, but if phosphorus pentoxide $P_2O_5$ is present in the glass, $P_2O_5$ acts as a glass forming oxide and increases the stabilization of the structure, namely, the stability for devitrification. Also, to improve the chemical durability, $P_2O_5$ is a requisite component. However, if $PF_5$ is less than 5 mol %, the glass will be unstable for devitrification and the chemical durability thereof will be remarkably reduced. If 21 mol % is exceeded, dispersion will become great and glass of the intended optical constant will not be obtained. Aluminum fluoride $AlF_3$ is important as a component for imparting a low dispersion nature to the glass and further, with $P_2O_5$, it contributes to the stabilization and improved chemical durability of the glass structure. If $AlF_3$ is less than 17 mol %, the intended low dispersion cannot be obtained and if 40 mol % is exceeded, no vitrification will occur. Of alkaline earth metals, fluorides of metals having small atomic numbers reduce the dispersion and particularly, calcium fluoride $CaF_2$ is effective to impart a low dispersion nature to the glass and also to widen the stable vitrification range for devitrification. Of alkaline earth metals, fluorides of metals having relatively great atomic numbers, such as strontium Sr and barium Ba, as compared with magnesium fluoride $MgF_2$ and calcium fluoride CaFe, have a disadvantage that they increase the dispersion, but are indispensable to keep the stability for devitrification. If CaF$_2$ is less than 13 mol %, the glass will be unstable for devitrification and the intended low dispersion cannot be obtained. On the other hand, if 40 mol % is exceeded, the devitrification tendency will be remarkably increased. At least 8 mol % as the sum of SrF$_2$ and BaF$_2$ is necessary to keep the stability of the glass for devitrification. However, an increased amount of these components would result in greater dispersion and therefore, the upper limits of SrF$_2$ and BaF$_2$ are 23 mol % and 25 mol %, respectively, and their sum must not exceed 33 mol %. Silicon fluoride SiF$_4$ enhances the viscosity of molten glass liquid and also improves the stability for devitrification. If SiF$_4$ is less than 0.05 mol %, its effect will not be obtained sufficiently and if 5 mol % is exceeded, the intended low dispersion will not be obtained.

The content ratio of fluorine ion number to oxygen ion number (F$^-$/O$^{2-}$) in glass greatly affects the stability of the glass for dispersion and devitrification. If the value of this ratio is smaller than 2.6, the dispersion will become too great and if it exceeds 15, the devitrification tendency will be enhanced.

The intended optical glass can be provided by the P-Al-Ca-Sr-Ba-Si-F-O system as described above, but by adding a suitable amount of other component thereto, the range of the optical constant can be further enlarged and the stability for devitrification can be further improved.

In some cases, if an alkaline metal fluoride R$^I$F is added, the stability for devitrification may be increased. However, if 14 mol % is exceeded, the viscosity of the molten glass liquid will be much reduced to make the production of glass difficult. MgF$_2$, like CaF$_2$, imparts a low dispersion nature to the glass and, if it is used with fluorides of other alkaline earth metals, it will enhance the stability of the glass for devitrification. However, if MgF$_2$ exceeds 22 mol %, it will remarkably enhance the devitrification tendency. If zinc fluoride ZnF$_2$ is added, the stability for devitrification may be increased in some cases. If more than a suitable amount of ZnF$_2$ is added, the intended low dispersion will not be obtained and therefore, the use of 7 mol % or less of ZnFe is desirable. Yttrium fluoride YF$_3$ imparts a low dispersion nature to the glass. However, if 7 mol % is exceeded, the devitrification tendency of the glass will be enhanced. By adding fluorides of rare earth elements, especially, lanthanum fluoride LaF$_3$, the stability for devitrification and the chemical durability can be improved. However, if more than 7 mol % is added, the intended low dispersion cannot be obtained. In addition, ZrF$_4$, PbF$_2$ and B$_2$O$_3$ up to 3 mol % may be added for the purpose of improving the stability for devitrification. On the other hand, glass with less than 5 mol % of NdF$_3$ added thereto can be used as laser glass of a small non-linear refractive index coefficient.

Of the above-described first composition range, a second composition glass containing MgF$_2$ in the range of 0.8–22 mol % is stable for devitrification and can result in glass of lower dispersion.

Of the second composition range, glass of the following third composition (shown in mol %) is more excellent in chemical durability.

| | |
|---|---|
| PF$_5$ | 6–21 |
| AlF$_3$ | 24–40 |
| R$^I$F | 0–8 |
| (R$^I$F is a combination of one or two or more of LiF, NaF or KF.) | |

In that case, F$^-$/O$^{2-}$ in the glass (the ratio of fluorine ion number to oxygen ion number) is 3.0–13.4.

Of the third composition range, the following fourth composition (shown in mol %) can provide glass which is particularly stable for devitrification.

| | |
|---|---|
| PF$_5$ | 8–21 |
| MgF$_2$ | 0.8–18 |
| CaF$_2$ | 17–34 |
| SrF$_2$ | 0.8–22 |
| BaF$_2$ | 0.8–20 |
| SrF$_2$ + BaF$_2$ | 8–28 |

In that case, F$^-$/O$^{2-}$ in the glass (the ratio of fluorine ion number to oxygen ion number) is 3.3–11.

Of the fourth composition range, the following fifth composition (shown in mol %) can provide glass of lower dispersion ($\nu d > 90$).

| | |
|---|---|
| PF$_5$ | 8–17 |
| CaF$_2$ | 22–34 |
| SiF$_4$ | 0.05–4 |

In that case, F$^-$/O$^{2-}$ in the glass (the ratio of fluorine ion number to oxygen ion number) is 3.7–11.

Of the fifth composition range, in the following sixth composition (shown in mol %), the viscosity of the molten glass liquid is high and the molding during the cast is easier.

| | |
|---|---|
| SiF$_4$ | 0.08–4 |
| R$^I$F | 0–5 |
| (R$^I$F is a combination of one or two or more of LiF, NaF or KF.) | |

As the phosphor and oxygen materials in the present invention, use may be made, for example, of metal phosphate containing component positive ions. Usually, use may preferably be made of metaphosphate of alkaline metals, alkaline earth metals or aluminum. A silicofluoride compound, for example, BaSiF$_6$, is used for silicon fluoride, and for example, K$_2$ZrF$_6$ is used for zirconium fluoride. As regards the other components, the fluorides mentioned in the embodiments are adopted as raw materials and they may be weighed and mixed at a desired rate, placed into an electric furnace or a platinum crucible of 800°–1000° C. for melting, clarification and stirring, homogenized, and then cast and gradually cooled down to thereby produce said other components.

The compositions (shown in mol %), refractive indices nd and Abbe numbers $\nu d$ of the embodiments of the optical glass according to the present invention are shown in Table 1 below. In Table 1, the upper column is the indication as fluorides and the lower column is the indication as the raw materials corresponding to the composition given in the upper column, and these are also shown in mol percent.

TABLE 1

Fluoride

TABLE 1-continued

| Composition | 1 | 2 | 3 | 4 | 5 | 6 | 7 | 8 | 9 |
|---|---|---|---|---|---|---|---|---|---|
| $PF_5$ | 20.30 | 12.82 | 10.62 | 10.71 | 9.01 | 5.63 | 8.18 | 15.23 | 17.21 |
| $AlF_3$ | 30.82 | 29.91 | 35.41 | 33.04 | 37.84 | 30.99 | 32.72 | 26.23 | 31.14 |
| $MgF_2$ |  |  | 5.31 | 16.07 | 17.12 | 10.33 | 8.18 | 12.52 | 12.30 |
| $CaF_2$ | 26.31 | 39.32 | 27.43 | 29.46 | 13.51 | 28.17 | 23.64 | 20.30 | 24.59 |
| $SrF_2$ | 7.52 | 14.53 |  | 8.93 | 9.91 | 14.08 | 21.82 | 1.69 | 5.74 |
| $BaF_2$ | 6.02 | 1.71 | 20.35 |  | 11.71 | 8.45 | 4.55 | 23.86 | 4.10 |
| $SiF_4$ | 2.26 | 1.71 | 0.88 | 1.79 | 0.90 | 0.47 | 0.91 | 0.17 | 0.82 |
|  | KF 6.77 |  |  |  |  | LiF 1.88 |  |  | LiF 4.10 |
| $F^-/O^{2-}$ | 2.8 | 5.1 | 6.4 | 5.8 | 7.9 | 12.6 | 8.6 | 4.0 | 3.4 |
| Indication as raw material |  |  |  |  |  |  |  |  |  |
| $Al(PO_3)_3$ | 8 | 5 |  | 4 |  | 2 | 3 | 6 | 7 |
| $Mg(PO_3)_2$ |  |  | 6 |  | 5 |  |  |  |  |
| $AlF_3$ | 33 | 30 | 40 | 33 | 42 | 31 | 33 | 25 | 31 |
| $MgF_2$ |  |  |  | 18 | 14 | 11 | 9 | 14.8 | 15 |
| $CaF_2$ | 35 | 46 | 31 | 33 | 15 | 30 | 26 | 24 | 30 |
| $SrF_2$ | 10 | 17 |  | 10 | 11 | 15 | 24 | 2 | 7 |
| $BaF_2$ | 8 |  | 22 |  | 12 | 8.5 | 4 | 28 | 4 |
| $BaSiF_4$ | $K_2SiF_6$ 3 | 2 | 1 | 2(added | 1 | 0.5 | 1 | 0.2 | 1 |
|  | $KPO_3$ 3 |  |  | as $SiO_2$) |  | LiF 2 |  |  | LiF 5 |
| $n_d$ | 1.4609 | 1.4505 | 1.4514 | 1.4328 | 1.4358 | 1.4359 | 1.4372 | 1.4707 | 1.4527 |
| $\nu_d$ | 87.3 | 91.6 | 91.4 | 90.8 | 95.4 | 96.2 | 95.7 | 87.2 | 87.9 |

| Fluoride Composition | 10 | 11 | 12 | 13 | 14 | 15 | 16 | 17 | 18 |
|---|---|---|---|---|---|---|---|---|---|
| $PF_5$ | 17.07 | 12.61 | 6.84 | 13.02 | 12.93 | 8.18 | 10.26 | 9.01 | 8.18 |
| $AlF_3$ | 30.09 | 29.41 | 25.65 | 17.36 | 25.87 | 31.82 | 29.92 | 32.43 | 32.73 |
| $MgF_2$ | 4.07 | 3.36 | 18.80 | 16.49 | 21.55 | 9.09 | 4.27 | 6.31 | 13.64 |
| $CaF_2$ | 14.63 | 33.61 | 20.51 | 19.97 | 21.55 | 22.73 | 25.64 | 31.53 | 26.36 |
| $SrF_2$ | 12.20 | 14.29 | 10.26 | 19.10 | 8.62 | 9.09 | 8.55 | 6.31 | 2.73 |
| $BaF_2$ | 19.51 | 3.36 | 17.09 | 11.28 | 8.62 | 10.00 | 4.27 | 9.01 | 10.00 |
| $SiF_4$ | 0.81 | 3.36 | 0.85 | 0.09 | 0.86 | 0.91 | 4.27 | 0.90 | 0.91 |
|  | NaF 1.62 |  |  | LiF 1.65 |  | NaF 8.18 | LiF 2.56 | $ZnF_2$ 4.50 | $LaF_3$ 5.45 |
|  |  |  |  | NaF 1.04 |  |  | NaF 5.13 |  |  |
|  |  |  |  |  |  |  | KF 5.13 |  |  |
| $F^-/O^{2-}$ | 3.5 | 5.2 | 7.1 | 4.5 | 4.9 | 8.2 | 6.3 | 7.7 | 8.6 |
| Indication as raw material |  |  |  |  |  |  |  |  |  |
| $Al(PO_3)_3$ | 7 | 5 |  | 5 | 5 |  |  |  | 3 |
| $AlF_3$ | 30 | 30 | 30 | 15 | 25 | 35 | 35 | 36 | 33 |
| $MgF_2$ | 5 | 4 | 22 | 19 | 25 | 10 | 5 | 7 | 15 |
| $CaF_2$ | 18 | 40 | 24 | 23 | 25 | 25 | 30 | 30 | 29 |
| $SrF_2$ | 15 | 17 |  | 22 | 10 | 10 | 10 | 7 | 3 |
| $BaF_2$ | 24 |  | 19 | 13 | 9 | 10 |  | 9 | 10 |
| $BaSiF_6$ | $Na_2SiF_6$ 1 | 4 | 1 | $Na_2SiF_6$ 0.1 | 1 | 1 | 5 | 1 | 1 |
|  |  |  | $Sr_3P_2O_8$ 1.9 | LiF 1.9 |  | $NaPO_3$ 9 | $NaPO_3$ 6 | $ZnF_2$ 5 | $LaF_3$ 6 |
|  |  |  |  | NaF 1 |  |  | $KPO_3$ 6 | $Ca(PO_3)_2$ 5 |  |
|  |  |  |  |  |  |  | LiF 3 |  |  |
| $n_d$ | 1.4724 | 1.4496 | 1.4540 | 1.4666 | 1.4576 | 1.4322 | 1.4318 | 1.4451 | 1.4434 |
| $\nu_d$ | 87.8 | 91.2 | 91.0 | 86.3 | 86.2 | 94.6 | 93.9 | 90.7 | 91.6 |

| Fluoride Composition | 19 | 20 | 21 | 22 | 23 |
|---|---|---|---|---|---|
| $PF_3$ | 8.18 | 7.34 | 15.33 | 12.61 | 8.18 |
| $AlF_3$ | 31.82 | 39.45 | 27.00 | 25.20 | 31.37 |
| $MgF_2$ | 6.36 | 6.42 | 3.65 | 16.81 | 10.91 |
| $CaF_2$ | 30.01 | 28.44 | 25.55 | 14.29 | 30.00 |
| $SrF_2$ | 6.36 | 6.42 | 7.30 | 8.40 | 6.36 |
| $BaF_2$ | 8.18 | 8.26 | 3.65 | 16.81 | 9.09 |
| $SiF_4$ | 0.91 | 0.92 | 2.92 | 0.84 | 0.45 |
|  | LiF 1.82 | LiF 0.92 | NaF 5.84 | $BF_3$ 5.04 | NaF 0.91 |
|  | $YF_3$ 6.36 | $PbF_2$ 1.83 | KF 5.84 |  | $NdF_3$ 2.73 |
|  |  |  | $ZrF_4$ 2.92 |  |  |
| $F^-/O^{2-}$ | 8.7 | 9.9 | 3.6 | 3.9 | 8.7 |
| Indication as raw material |  |  |  |  |  |
| $Al(PO_3)_3$ | 3 |  | 7 | 5 | 3 |
| $AlF_3$ | 32 | 43 | 30 | 25 | 31.5 |
| $MgF_2$ | 7 | 7 | 5 | 20 | 12 |
| $CaF_2$ | 33 | 27 | 35 | 17 | 33 |
| $SrF_2$ | 7 | 7 | 10 | 10 | 7 |
| $BaF_2$ | 8 | 8 | 5 | 19 | 10 |
| $BaSiF_6$ | 1 | 1 | $Na_2SiF_6$ 4 | 1 | $Na_2SiF_6$ 0.5 |
|  | LiF 2 | LiF 1 | $K_2ZrF_6$ 4 | $B_2O_3$ 3 | $NaF_3$ 3 |
|  | $YF_5$ 7 | $PbF_2$ 2 |  |  |  |
|  |  | $Ca(PO_3)_2$ 4 |  |  |  |
| $n_d$ | 1.4435 | 1.4384 | 1.4509 | 1.4765 | 1.4419 |
| $\nu_d$ | 92.9 | 88.8 | 86.4 | 86.3 | 93.8 |

Table 2 provides the composition of glasses 1-23 in weight percentages as follows:

TABLE 2

| Component | Glass Composition No. | | | | | | | | | | |
|---|---|---|---|---|---|---|---|---|---|---|---|
| | 2 | 3 | 4 | 5 | 6 | 7 | 8 | 9 | 10 | 11 | 12 |
| $P_2O_5$ | 11.89 | 6.87 | 5.61 | 5.59 | 4.67 | 2.76 | 4.15 | 8.50 | 9.52 | 9.80 | 6.71 | 3.50 |
| $Al_2O_3$ | 19.45 | 17.27 | 20.17 | 18.59 | 21.10 | 16.39 | 17.90 | 15.77 | 18.57 | 18.61 | 16.88 | 14.17 |
| MgO | | | 3.22 | 9.63 | 19.17 | 5.82 | 4.77 | 8.03 | 7.82 | 2.68 | 2.05 | 11.66 |
| CaO | 19.64 | 26.85 | 18.48 | 19.61 | 8.91 | 17.63 | 15.30 | 14.45 | 17.34 | 10.71 | 22.83 | 13.40 |
| SrO | 6.44 | 11.40 | | 6.83 | 7.50 | 10.12 | 16.22 | 1.38 | 4.64 | 10.25 | 11.15 | 7.70 |
| BaO | 5.47 | 1.43 | 16.69 | | 9.41 | 6.44 | 3.59 | 30.59 | 3.52 | 17.38 | 2.78 | 13.60 |
| $SiO_2$ | 1.35 | 0.94 | 0.48 | 0.95 | 0.48 | 0.24 | 0.48 | 0.10 | 0.46 | 0.48 | 1.83 | 0.45 |
| $Li_2O$ | | | | | | 1.20 | | | 2.95 | 1.17 | | |
| $Na_2O$ | | | | | | | 1.22 | | | 0.74 | | |
| $K_2O$ | 5.71 | | | | | | | | | | | |
| ZnO | | | | | | | | | | | | |
| $Y_2O_3$ | | | | | | | | | | | | |
| $La_2O_3$ | | | | | | | | | | | | |
| $Nd_2O_3$ | | | | | | | | | | | | |
| $ZrO_2$ | | | | | | | | | | | | |
| $F_2$—O | 30.04 | 35.25 | 35.35 | 38.80 | 38.69 | 39.41 | 37.60 | 31.09 | 35.18 | 28.87 | 35.77 | 36.12 |

| Component | 13 | 14 | 15 | 16 | 17 | 18 | 19 | 20 | 21 | 22 | 23 |
|---|---|---|---|---|---|---|---|---|---|---|---|
| $P_2O_5$ | | 7.08 | 6.90 | 4.25 | 5.49 | 4.61 | 4.14 | 4.12 | 3.66 | 8.47 | 7.13 | 4.14 |
| $Al_2O_3$ | | 10.16 | 14.88 | 17.79 | 17.24 | 17.89 | 17.84 | 17.28 | 21.18 | 16.06 | 15.38 | 17.09 |
| MgO | | 10.29 | 13.20 | 5.42 | 2.62 | 3.70 | 7.92 | 3.68 | 3.67 | 2.31 | 10.92 | 6.34 |
| CaO | | 13.82 | 14.66 | 15.04 | 17.48 | 20.58 | 16.99 | 19.28 | 18.07 | 17.71 | 10.31 | 19.35 |
| SrO | | 15.19 | 6.73 | 6.91 | 6.69 | 4.73 | 2.02 | 4.70 | 4.69 | 5.90 | 6.96 | 4.71 |
| BaO | | 9.50 | 7.14 | 8.06 | 3.54 | 7.16 | 7.85 | 6.40 | 6.39 | 3.13 | 14.77 | 7.14 |
| $SiO_2$ | | 0.05 | 0.47 | 0.49 | 2.34 | 0.47 | 0.48 | 0.47 | 0.47 | 1.66 | 0.48 | 0.23 |
| $Li_2O$ | | 1.17 | | | 1.78 | | | 1.19 | 0.59 | | | |
| $Na_2O$ | | 0.74 | | 5.56 | 3.60 | | | | | 4.22 | | 0.60 |
| $K_2O$ | | | | | 3.95 | | | | | 4.64 | | |
| ZnO | | | | | | 3.22 | | | | | | |
| PbO | | | | | | | | | | 1.48 | | |
| $Y_2O_3$ | | | | | | | | | 4.40 | | | |
| $La_2O_3$ | | | | | | | 4.07 | | | | | |
| $Nd_2O_3$ | | | | | | | | | | | | 2.05 |
| $ZrO_2$ | | | | | | | | | | 2.11 | | |
| $B_2O_3$ | | | | | | | | | | | 2.67 | |
| $F_2$—O | | 32.00 | 36.01 | 36.48 | 35.27 | 37.61 | 38.70 | 38.48 | 39.81 | 33.52 | 31.38 | 38.35 |

Table 3 provides the composition of glasses 1-23 in weight percentages as follows:

TABLE 3

| Component | Glass Composition No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $PF_5$ | 26.02 | 17.05 | 11.40 | 13.48 | 11.74 | 7.99 | 12.73 | 16.72 | 24.85 | 19.24 | 16.51 | 8.48 |
| $AlF_3$ | 26.33 | 26.53 | 25.35 | 27.71 | 32.88 | 29.33 | 33.91 | 19.19 | 29.99 | 22.61 | 25.66 | 21.20 |
| $MgF_2$ | | | 2.82 | 10.00 | 11.04 | 7.25 | 6.29 | 6.79 | 8.78 | 2.27 | 2.17 | 11.52 |
| $CaF_2$ | 20.90 | 32.42 | 18.26 | 22.98 | 10.92 | 24.78 | 22.79 | 13.81 | 22.01 | 10.22 | 27.26 | 15.76 |
| $SrF_2$ | 9.62 | 18.95 | 10.99 | 23.97 | 11.21 | 12.87 | 13.26 | 6.91 | 3.93 | 13.71 | 18.65 | 12.69 |
| $BaF_2$ | 10.74 | 3.17 | 30.40 | | 21.24 | 16.68 | 9.85 | 36.43 | 8.24 | 30.59 | 6.12 | 29.48 |
| $SiF_4$ | 2.39 | 1.88 | 0.78 | 1.86 | 0.97 | 0.55 | 1.17 | 0.15 | 0.98 | 0.75 | 3.63 | 0.87 |
| LiF | | | | | | 0.55 | | | 1.22 | | | |
| NaF | | | | | | | | | | 0.61 | | |
| KF | 4.00 | | | | | | | | | | | |
| $ZnF_2$ | | | | | | | | | | | | |
| $PbF_2$ | | | | | | | | | | | | |
| $YF_3$ | | | | | | | | | | | | |
| $LaF_3$ | | | | | | | | | | | | |
| $NdF_3$ | | | | | | | | | | | | |
| $ZrF_4$ | | | | | | | | | | | | |
| weight ratio of $F^-/O^{2-}$ | 3.3 | 6.1 | 7.6 | 6.9 | 9.4 | 15.0 | 10.2 | 4.8 | 4.0 | 4.2 | 6.2 | 8.4 |

| Component | 13 | 14 | 15 | 16 | 17 | 18 | 19 | 20 | 21 | 22 | 23 |
|---|---|---|---|---|---|---|---|---|---|---|---|
| $PF_5$ | 16.16 | 17.13 | 10.99 | 14.49 | 11.77 | 10.37 | 10.58 | 9.55 | 20.65 | 15.43 | 10.61 |
| $AlF_3$ | 14.35 | 22.84 | 28.50 | 28.18 | 28.24 | 27.63 | 27.43 | 34.22 | 24.22 | 20.55 | 27.12 |
| $MgF_2$ | 10.11 | 14.12 | 6.04 | 2.98 | 4.08 | 8.55 | 4.06 | 4.13 | 2.43 | 10.17 | 7.00 |
| $CaF_2$ | 15.35 | 17.69 | 18.93 | 22.44 | 25.53 | 20.69 | 24.04 | 22.94 | 21.33 | 10.84 | 24.11 |
| $SrF_2$ | 23.63 | 11.39 | 12.18 | 12.04 | 8.22 | 3.45 | 8.20 | 8.33 | 9.81 | 10.24 | 8.23 |
| $BaF_2$ | 19.46 | 15.89 | 18.69 | 8.40 | 16.37 | 17.62 | 14.72 | 14.96 | 6.84 | 28.60 | 16.40 |
| $SiF_4$ | 0.09 | 0.94 | 1.01 | 4.98 | 0.97 | 0.95 | 0.97 | 0.99 | 3.25 | 0.85 | 0.48 |
| LiF | 0.42 | | | 0.74 | | | 0.43 | 0.25 | | | |
| NaF | 0.43 | | 3.66 | 2.41 | | | | | 2.62 | | 0.39 |
| KF | | | | 3.34 | | | | | 3.63 | | |
| $ZnF_2$ | | | | | 4.82 | | | | | | |

TABLE 3-continued

| Component | Glass Composition No. | | | | | | | | | | |
|---|---|---|---|---|---|---|---|---|---|---|---|
| PbF$_2$ | | | | | | | 4.63 | | | | |
| YF$_3$ | | | | | | | | 9.52 | | | |
| LaF$_3$ | | | | | | 10.74 | | | | | |
| NdF$_3$ | | | | | | | | | | | 5.66 |
| ZrF$_4$ | | | | | | | | 5.22 | | | |
| BF$_3$ | | | | | | | | | 3.32 | | |
| weight ratio of F$^-$/O$^{2-}$ | 5.3 | 5.8 | 9.7 | 7.5 | 9.1 | 10.2 | 10.3 | 11.8 | 4.3 | 4.6 | 10.3 |

As has been described above, according to the present invention, there can be achieved fluophosphate optical glass which contains neither beryllium nor arsenic and which has a low dispersion of refractive index nd=1.43–1.48 and Abbe number νd=85–97 and yet can be produced stably and easily.

I claim:

1. Beryllium-and arsenic-free fluophosphate optical glass having a refractive index of from 1.4451 to 1.48 and an Abbe number of more than 90 to 97 containing fluorine ion F$^-$ and oxygen ion O$^{2-}$ as negative ions, wherein when the positive ions in the glass are expressed as fluorides, said glass consists essentially of, in mol percent:

| | |
|---|---|
| PF$_5$ | 8–17 |
| AlF$_3$ | 24–40 |
| CaF$_2$ | 22–34 |
| SrF$_2$ | 0.8–22 |
| BaF$_2$ | 0.8–20 |
| SrF$_2$ + BaF$_2$ | 8–28 |
| SiF$_4$ | 0.05–4 |
| R$^J$F | 0–8 |
| (R$^J$F is a combination of one or two or more of LiF, NaF or KF) | |
| MgF$_2$ | 0.8–18 |
| ZnF$_2$ | 0–7 |
| YF$_3$ | 0–7 |
| LaF$_3$ | 0–7 | and the ratio F$^-$/O$^{2-}$ in the glass (the ratio of fluorine ion number to oxygen ion number) is in the range of 3.7–11; whereby the tendency of the optical glass during formation to devitrify is suppressed and the viscosity of the glass in the molten state is enhanced to reduce striations.

2. Fluophosphate optical glass according to claim 1, wherein said glass contains, in mol percent:

| | |
|---|---|
| SiF$_4$ | 0.08–4 |
| R$^J$F | 0–5 |
| (R$^J$F is a combination of one or two or more of LiF, NaF or KF). | |

* * * * *

UNITED STATES PATENT AND TRADEMARK OFFICE
CERTIFICATE OF CORRECTION

PATENT NO. : 4,427,784
DATED : January 24, 1984
INVENTOR(S) : HIROSHI NAKAMURA, ET AL.

It is certified that error appears in the above-identified patent and that said Letters Patent is hereby corrected as shown below:

Headnote, item [75] "Icwimura" should be --Ichimura--.

Column 5, Table 1, under column heading "Composition",
"$BaSiF_4$" should be --$BaSiF_6$--;
Table 1, under column heading 12, "$Sr_3P_2O_8 1.9$" should be --$Sr_3P_2O_8 4$--.

Signed and Sealed this

Twenty-first Day of October, 1986

[SEAL]

Attest:

DONALD J. QUIGG

Attesting Officer

Commissioner of Patents and Trademarks